Feb. 5, 1957     S. T. WILLIAMS ET AL     2,780,243

PLASTIC VALVE CAP

Filed Sept. 22, 1953

INVENTOR.
Selden T. Williams
Frank R. Hormann.
By Churchill, Rich, Weymouth & Engel
Attorneys

United States Patent Office 2,780,243
Patented Feb. 5, 1957

2,780,243
PLASTIC VALVE CAP

Selden T. Williams, Bellerose, and Frank R. Hormann, Brooklyn, N. Y., assignors to Scovill Manufacturing Company, Waterbury, Conn., a corporation of Connecticut Application September 22, 1953, Serial No. 381,594

2 Claims. (Cl. 138—89.3)

The present invention relates to a plastic tire valve cap and aims to provide certain improvements therein.

For many years, caps for pneumatic tire valves comprised a metal shell, carrying a sealing washer. The major requirement of such a cap was to provide a secondary seal to the valve core—and initially the cap was the seal of importance.

Of course, the cap had another service to perform, namely, to keep the tire valve mouth clean, and to protect the threads from injury. But in the days when valve cores did not possess the high degree of dependability that they do today, the sealing value of the cap was, as stated, the feature that was important. This importance of cap functioning endures today on heavy duty applications of pneumatic valves, as on trucks, buses, earth movers, airplanes, tractors, etc., where heat, dirt and unavailability of service are existent. On passenger vehicles, however, the importance of the cap as a secondary seal has diminished—largely due to the improvements made in the valve core and the resulting effectiveness in this kind of service. For this reason, a lower cost plastic cap, incorporating a cheaper, non-swiveling washer has become common for use on valve stems on passenger vehicle valve tires and on some bicycle tires. The cheapness of the plastic cap is the feature of greatest appeal and it also presents a good appearance.

However, plastic caps have certain disadvantages, to wit: they do not have a screw driver top to remove the valve core, and this can be embarrassing; the cap is brittle, and easily broken; and the rubber sealing washer becomes ineffective after a limited number of applications.

Accordingly, the present invention has among its objects the following: to provide plastic caps which can be made and sold at a lower price than prior plastic caps; which will be pleasing in appearance; which will not require a supplemental sealing washer; which will be resistant to abuse; which will have improved air-holding facilities over prior plastic caps and which can be more readily applied to valve stems in tube-packaging rooms.

The foregoing and other objects of the present invention not specifically enumerated are accomplished by forming the caps of a deformable plastic material having a memory characteristic, such as polyethylene, preferably by molding the caps to predetermined shape and dimensions so that the open mouth of the cap will telescope over the closed end of another cap whereby the caps may be nested or stacked in end-to-end relation in substantially axial alignment to form a rod of caps. The invention and the advantages resulting therefrom will be better understood from the detailed description which follows, when considered in connection with the accompanying drawings, wherein:

Figure 2:
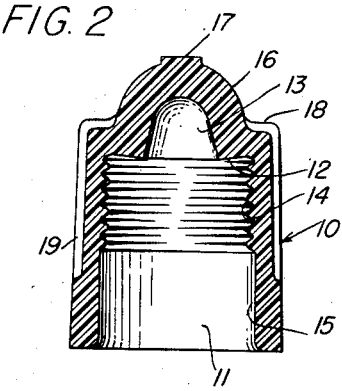
Fig. 2 shows a diametrical sectional view of the cap taken along the plane of the line 2—2 of Fig. 1.
Figure 1:
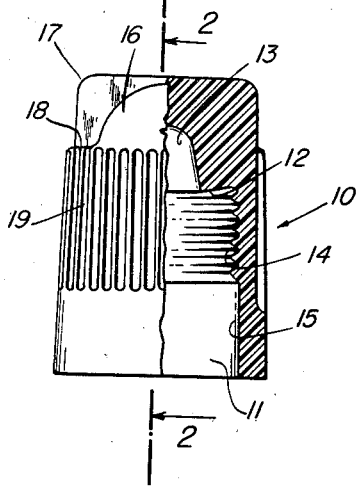
Figure 1 shows a side elevational view of a cap embodying my invention, part thereof being broken away to better illustrate the structure.

In the drawing, we have shown a preferred form of cap 10 of generally cylindrical shape formed with a cup-shaped axial socket 11 having a base 12 providing a shoulder which, in turn, is formed with a secondary cup-shaped axial socket 13. The cup-shaped socket 11 is formed with a screw-threaded portion 14 extending from the base to a point axially inwardly of the open end of the socket and with an unthreaded open mouth portion 15 extending from the screw-thread to the open mouth, the diameter of the unthreaded portion 15 being at least as large as the outer diameter of the screw-thread 14 and of an axial dimension at least equal to twice the pitch of the screw-thread 14. The closed end of the cap is formed with a dome-shaped protuberance 16 having a diametrical rib 17, the maximum dimension of which, measured along the diameter of the cap is slightly greater than the diameter of the unthreaded socket portion 15 and the axial dimension of which is preferably less than the axial dimension of the socket portion 15. The dome-shaped protrusion forms with the cylindrical portion of the cap a shoulder 18.

The cap 10 in its entirety is preferably formed of molded, deformable plastic material having a memory characteristic. The most suitable material for this purpose is polyethylene which is a strong, wax-like plastic, resistant to most chemicals and possesses a memory characteristic, that is, it will revert to its molded form even if badly distorted. A cap formed of polyethylene may be dropped on the floor and stepped upon without breaking and it may be used satisfactorily thereafter. Such cap cap be pushed onto the mouth end of a tire valve stem, tightened with a few turns and will seal and seat itself to the mouth quite effectively. To insure and promote the effectiveness of the seal, the shoulder provided by the base 12 of the cup-shaped socket 11 is preferably of frustoconical form with its taper directed axially toward the open mouth of the socket, said frusto-conical form in conjunction with the secondary socket 13 providing for deformation of the base when the cap is screwed home upon a valve stem. By virtue of the memory characteristic, the deformation of the base 12 when screwed home upon a valve stem will act, to a limited degree, as a lock nut to prevent loosening of the cap.

Figure 3:
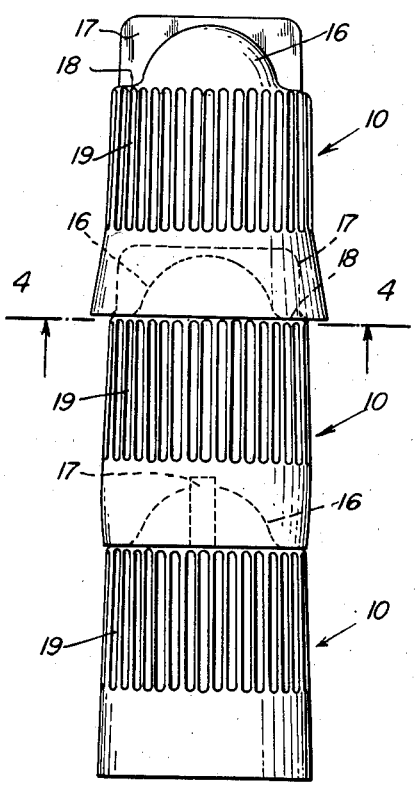
Fig. 3 shows an elevational view of the manner in which the valve caps may be stacked or nested.
Figure 4:
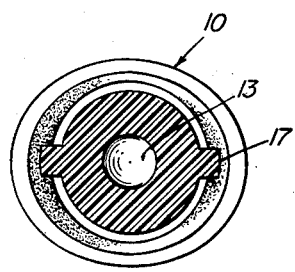
Fig. 4 shows a sectional view taken along the plane of the line 4—4 of Fig. 3.

The relationship of the dimension and shape of the cap at its closed end to the dimensions of the unthreaded socket portion 15 permits the closed end of one cap to be inserted into the socket mouth of another cap and to be held in nested relation thereon, as best shown in Figs. 3 and 4. In this nesting relationship it will be noted that the unthreaded socket portion 15 is deformed into elliptical shape by the diametrical rib to hold a pair of caps together in substantially axial alignment. The importance of this feature is that the caps may be mechanically stacked or nested in groups of say 5—enough for one car—and packed attractively and effectively. Furthermore, by having a group of caps so stacked they provide for efficiently applying the caps to valve stems in the tire tube packing rooms. For example, a stacked group of five caps may be grasped by an operator and readily and quickly positioned and pushed onto the valve mouths of completed tubes. The exterior wall of the cap may be knurled or ribbed, as shown at 19, or otherwise roughened or ornamented as desired. Because of the slight elasticity of the material from which the caps are made, the caps do not have to be screwed into place one by one and the whole operation of application greatly simplifies and expedites the application of the caps to valve stems.

In Fig. 3 of the drawings the uppermost cap 10 and the cap next below it are shown with the ribs 17 disposed in substantially a common plane to emphasize the distension at the mouth end of the uppermost cap. The lowermost cap is disposed with the rib 17 at right angles to the rib on the cap above it, wherefore the distension at the mouth of the intermediate cap is in a plane substantially at right angles to the plane of the drawing and not so apparent as in the uppermost cap. It will be appreciated however, that in stacking the caps, which may be done automatically by feeding the caps from a specially designed hopper, the angular disposition of the diametrical ribs of adjacently stacked caps is of no consequence.

While we have shown and described a preferred embodiment of my invention, it is to be understood that the caps may be made in any desired color to suit its intended environmental use, and the shape and dimensions of the cap may be varied within the range of mechanical skill, without departing from the spirit of the invention as hereinafter claimed.

What we claim is:

1. A valve cap formed of polyethylene having a cup-shaped axial socket which is internally screw-threaded and formed at its open mouth with an unthreaded bore having the diameter at least as large as the outer diameter of the screw-thread and an axial depth equal to at least twice the pitch of the screw-thread, the cap at its closed end having an external protuberance and an external shoulder at the inner end of the protuberance, the axial dimension of the protuberance being no greater than the axial dimension of the unthreaded mouth portion of the socket and the maximum dimension of the protuberance measured along a diameter of the cap being slightly greater than the diameter of the unthreaded mouth portion of the socket, whereby, when the protuberance of one cap is inserted into the mouth portion of another cap so that the external shoulder on the inserted cap engages the open end of the mouth portion of said another cap, the two caps will hold nested together in substantially axial alignment.

2. A valve cap according to claim 1 wherein the protuberance at the closed end of the cap consists of a dome-shaped portion and a diametrical rib which projects both laterally and axially beyond the dome-shaped portion.

References Cited in the file of this patent

UNITED STATES PATENTS

| | | |
|---|---|---|
| 1,141,219 | Stadelman | June 1, 1915 |
| 1,374,395 | Schmidt | Apr. 12, 1921 |
| 1,489,468 | Struble et al. | Apr. 8, 1924 |
| 1,546,159 | Wippler | July 14, 1925 |
| 1,746,999 | Gits | Feb. 11, 1930 |
| 2,238,681 | Dorough | Apr. 15, 1941 |
| 2,424,802 | Crowley | July 29, 1947 |
| 2,617,553 | Lay | Nov. 11, 1952 |
| 2,672,160 | Wrabel | Mar. 16, 1954 |

FOREIGN PATENTS

| | | |
|---|---|---|
| 656,146 | France | Dec. 24, 1928 |